United States Patent [19]

Doty et al.

[11] 3,710,264

[45] Jan. 9, 1973

[54] AXIAL TRAJECTORY SENSOR HAVING GATING MEANS CONTROLLED BY PULSE DURATION MEASURING FOR ELECTRONIC PARTICLE STUDY APPARATUS AND METHOD

[75] Inventors: Edward Neal Doty; Walter R. Hogg, both of Miami, Fla.

[73] Assignee: Coulter Electronics, Inc., Hialeah, Fla.

[22] Filed: May 12, 1971

[21] Appl. No.: 142,531

Related U.S. Application Data

[63] Continuation-in-part of Ser. No. 132,771, April 9, 1971.

[52] U.S. Cl..................328/91, 324/71 CP, 328/112, 328/116
[51] Int. Cl............................H03k 17/02, H03k 5/20
[58] Field of Search........328/91, 111, 112, 115, 116, 328/117; 324/71 CP

[56] References Cited

UNITED STATES PATENTS

| | | | |
|---|---|---|---|
| 3,548,206 | 12/1970 | Ogle et al. | 328/116 X |
| 3,611,157 | 10/1971 | Hughes | 328/112 |
| 3,600,688 | 8/1971 | Booth | 328/112 X |

*Primary Examiner*—Stanley D. Miller, Jr.
*Attorney*—Silverman & Cass

[57] ABSTRACT

A sensor for use with apparatus operating in accordance with the principles of the Coulter electronic particle studying device for differentiating between signals from particles passing on axial or near axial trajectories through an aperture and particles passing off center. The particle pulse duration is measured at two or more fractions of the amplitude for each individual particle pulse. These pulse durations so measured are converted into voltages which represent the respective durations of the several fractional amplitudes and are compared with certain reference voltages. The reference voltage for one fractional amplitude is derived from a memory circuit which remembers the duration at that same fractional amplitude for the smallest of prior pulses processed by the sensor. Using this information, a reference voltage is established for that one fractional amplitude as the maximum permissible level below which the duration-representing voltage is acceptable and above which the duration-representing voltage is not acceptable. This same reference voltage derived from the memory circuit is used to establish maximum and minimum levels for the other fractional amplitude duration-representing voltages. In addition to the one duration-representing voltage falling below its reference level, the duration-representing voltages of all other fractional amplitudes must fall between the maximum and minimum reference voltages, respectively, which have been established for them in order to operate gating means to pass the particle pulse. All other pulses will be disregarded. On such account, pulses must have the proper shape and duration to be passed by the sensor.

Other structure operating on the relationship between the several durations of the fractional amplitudes of each pulse irrespective of the actual durations pass or discard particle pulses depending upon their shape only, independent of duration.

34 Claims, 6 Drawing Figures

United States Patent [19]
Doty et al.
[11] 3,710,264
[45] Jan. 9, 1973
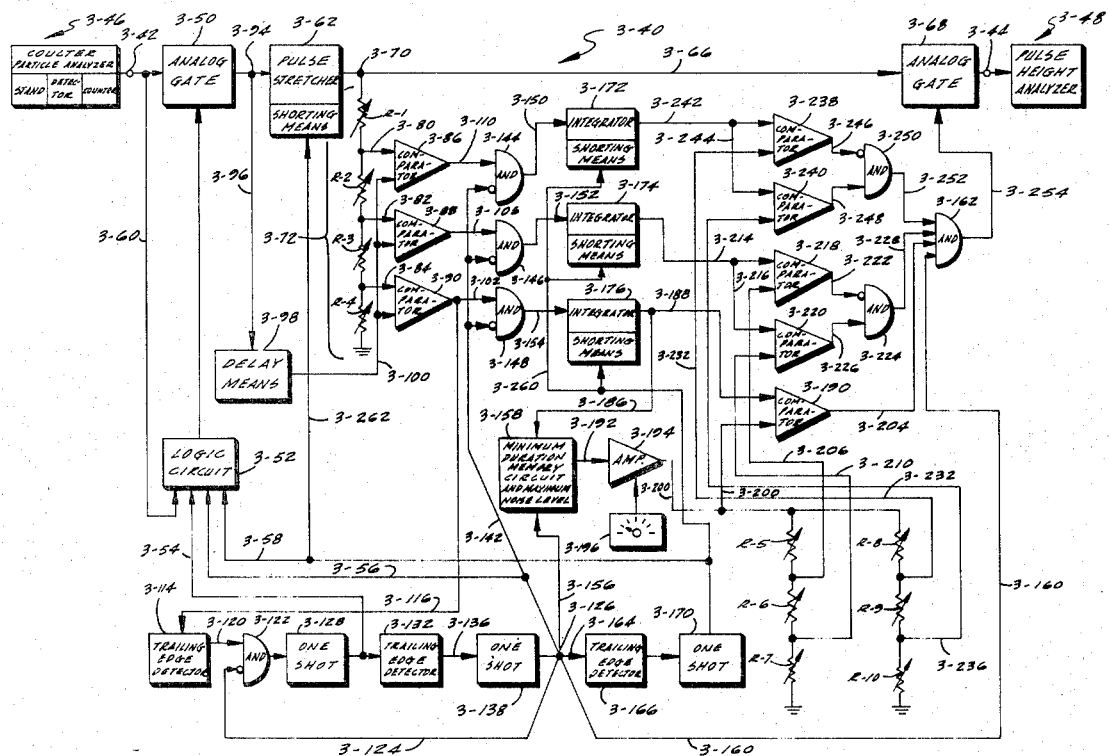

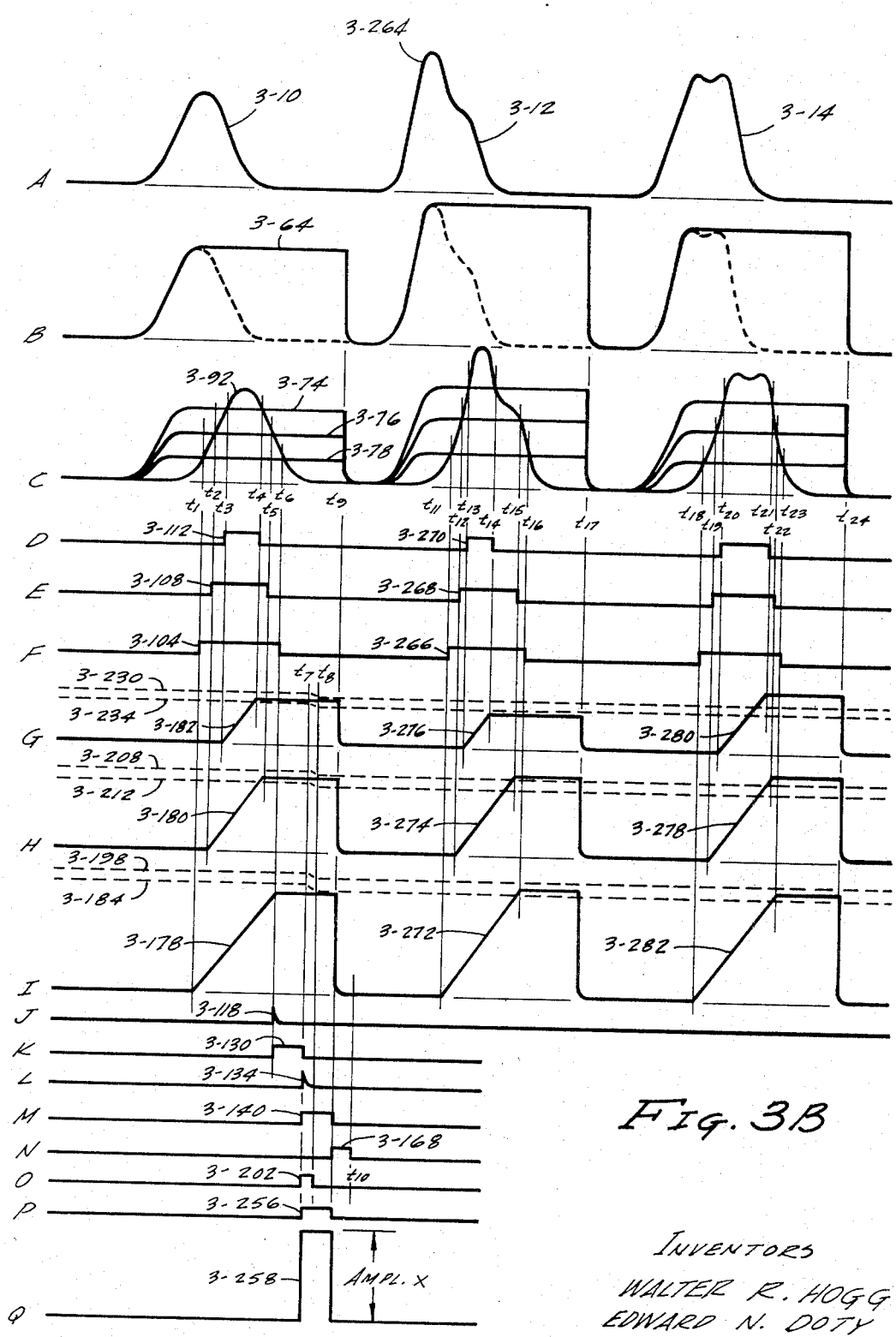

AXIAL TRAJECTORY SENSOR HAVING GATING MEANS CONTROLLED BY PULSE DURATION MEASURING FOR ELECTRONIC PARTICLE STUDY APPARATUS AND METHOD

CROSS REFERENCE TO RELATED APPLICATIONS

The application herein is a continuation-in-part of a copending application of the same title identified as Case VII, Ser. No. 132,771, filed Apr. 9, 1971. Reference is made in said copending application Case VII to three other copending applications, all having the same title identified as follows:

Case I — Ser. No. 84,440, filed Oct. 27, 1970;
Case II — Ser. No. 101,325, filed Dec. 24, 1970; and
Case III — Ser. No. 113,165, filed Feb. 8, 1971.

Applicant herein is co-applicant with others in Cases III and VII and is the sole applicant in Cases I and II. All of the applications including that herein are assigned to the same assignee.

BACKGROUND OF THE INVENTION

The field of this invention is particle analyzing apparatus and more particularly is concerned with apparatus in which studies may be made of particulate systems using the Coulter sensing principle in a manner to obtain more accurate size information than heretofore achieved.

The background of this invention is the same as that of the copending application Case VII of which this constitutes a continuation-in-part and hence the discussion of the background set forth therein may be considered repeated herein.

Basically, the copending application Case VII of which this constitutes a continuation-in-part teaches the testing of a particle pulse at a plurality of levels to ascertain whether it is one that has passed on an axial trajectory through an aperture. Certain pulses will have the same duration at some fractional level of their amplitudes but not the same duration at other fractional levels of their amplitudes. These pulses obviously are of different shape, while possibly having the same duration at their base lines. In the structures of copending applications Cases I and II and possibly in certain instances in the structures of copending application Case III, it is likely that many pulses are passed by the axial trajectory sensor which could not stand the same test conducted at several fractional amplitudes.

The application herein differs from the copending application Case VII in that instead of using the previous duration memory circuit utilizing some percentile of fractional pulse height durations, the previous duration memory circuit here used is that which is described in detail in copending application Case II. In that latter application it is called a minimum duration memory circuit. This latter circuit establishes a reference level which represents the duration of the previous shortest pulse processed by the sensor (noise and partial pulses being excluded by suitable circuitry). In the invention herein, the reference levels are established on the basis of the longest duration level of each pulse which will be the lowest fraction, and the reference level for the other fractional amplitudes are achieved by attenuating the longest reference level. As in the case of the copending application Case VII, the resulting circuit distinguishes between pulses on the basis of both duration and shape. In other words, a particle pulse passing on an axial trajectory through an aperture of the so-called short variety will have a certain duration and a certain shape. Unless it has both of these attributes, it is probably an erroneous pulse, that is, one whose amplitude is not necessarily proportional to the size of the particle which produced the same.

The invention herein covers another aspect of the technique of distinguishing between pulses whose particles traversed the aperture on axial trajectories. This aspect relates to structure and methods for distinguishing between pulses on the basis of shape alone, irrespective of duration. Thus, if one constructs an axial trajectory sensor for use with Coulter apparatus, discriminating between particle pulses on the basis of shape and duration, the characteristics of the circuit are most likely to be useful only for the single aperture which is "matched" to the sensor. A change in the dimensions of the aperture, such as for example increasing its length, will automatically increase the duration of all particle pulses. In most, if not all cases, the constants of the sensor circuitry will have to be adjusted to accommodate the new aperture characteristics. In the case of an axial trajectory sensor that is constructed to respond to criteria of shape alone, assuming that the aspect ratio of the aperture has not changed materially, the axial trajectory sensor will give good results. It will not discard any pulses on the basis of variation in duration alone, but is considerably simpler than the structures of the copending application Case VII and the one described above. Aspect ratio is the relation of length to diameter.

SUMMARY OF THE INVENTION

According to the invention, a particle pulse derived from a Coulter particle analyzing apparatus is stretched and delayed. The stretched pulse is attenuated in accordance with predetermined ratios of resistance to provide a plurality of stretched pulses whose amplitudes are predetermined fractions of the amplitude of the particle pulse such as for example 25, 50 and 75 percent. The unattenuated delayed pulse is compared with the plurality of attenuated pulses and a plurality of duration-measuring pulses is obtained, one for each fractional amplitude. Thus there is a separate duration-measuring pulse for the 25, 50 and 75 percent amplitudes respectively, in the example used. The durations measuring pulses are then converted into electrical time signal pulses whose amplitudes are proportional to the respective durations of the duration-measuring pulses from which the same were converted. Thereafter, the electrical time signal pulses are compared with voltage levels for each fractional amplitude which are established on the basis of prior minimum duration pulses which have been processed by the sensor and remembered by a memory circuit.

A gate is provided which is enabled to pass a signal only if all of the fractional amplitudes of a given particle pulse meet the criteria established by the memory circuit. If any one does not meet its particular standard, the gate is not opened. The signal passed by the gate is a strobing signal produced at a suitable time by the circuitry which will coincide with a flat portion of the original stretched pulse. The original stretched pulse is applied to the output terminal of the circuit through an analog gate or switch means controlled by the output of the firsthmentioned gate. If a strobing pulse is permitted to pass said first gate, it will permit a portion of the original stretched pulse to pass to the output terminal, this latter pulse having the time duration of the strobing pulse (as will all output pulses) but having the amplitude of the stretched pulse and hence the original particle pulse.

In another version of the invention, instead of using a minimum duration memory circuit to establish the criteria for the several fractional amplitudes, one of the electrical time signal pulses is suitably modified to establish criteria against which the other electrical time signal pulses are compared. The same type of output is provided as in the first above described structure. In this case, however, it will be seen that the only basis for accepting or rejecting pulses is shape and not duration and shape. The modification of the one electrical time signal pulse which is used as the basic standard is achieved by voltage dividers suitably adjusted manually.

BRIEF DESCRIPTION OF THE DRAWINGS

FIG. 3B is a diagram consisting of a series of graphs all on the same time base illustrating various wave shapes throughout the sensor of FIG. 3A resulting from the processing of three particle pulses therein;

DESCRIPTION OF THE PREFERRED EMBODIMENTS

The invention herein, like those of the copending applications, is based upon the practical consideration of the electric pulses which result when a suspension of particles is passed through the aperture of a Coulter electronic particle analyzing device. It has been seen that the electric pulses depend to an important extent upon the portions of the aperture through which the particles which produced the pulses passed. From the disclosures and teachings of the copending applications, it was learned that the only desirable pulses which are produced in the ordinary Coulter aperture with its sharp entrance and exit are those which travelled on substantially an axial trajectory or path through the aperture. All of the others will have durations and/or shapes which are not acceptable because the amplitude does not in every case comply with the basic Coulter principle and hence is not proportional to the size of the particle which produced the same.

The pulse which is produced when a particle passes off center may have any one or more of several characteristics. If it passes near one corner, it may have a false peak. It may have two peaks if it passes near two corners. It may be of unusually long duration if it enters any part of the turbulent or stagnant regions just alongside of the walls of the aperture. In all of these cases, the shape and/or duration of the pulse depart from the normal pulse which is the desirable bell shape resulting when the particle passed on an axial trajectory.

Copending applications Cases I, II and III disclosed structures and methods for discriminating between pulses on the basis of their durations or their durations between certain points of said pulses, such as for example, their duration at a fractional amplitude. Copending application Case VII discriminated between pulses on the basis of their shapes as well as their durations by making the measurements at a plurality of fractional amplitudes. Thus, it would be possible that a pulse whose upper configuration is distorted or falsely peaked for some reason has a duration at the amplitude which is being measured as for example by structures of the copending applications Cases I, II and III which is acceptable. Such a pulse should be discarded and would be discarded if the duration measurements were made at a plurality of fractional amplitudes as taught in copending application Case VII. Likewise, in this application, the same pulse would be discarded since it does not meet the criteria established at a plurality of levels.

Figure 2:
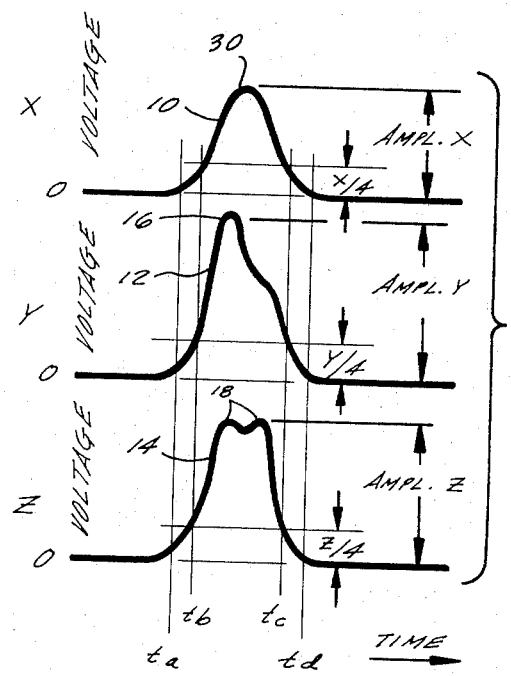
FIG. 2 is a diagram showing the graphs of particle pulses resulting from the passage of the particles of FIG. 1 along the paths shown through the aperture, all graphs being on the same time base.

In order to show how this invention is applied, in FIG. 2 three pulses are illustrated at 10, 12 and 14, all of them having different amplitudes X, Y and Z, respectively, but in each case having the same duration at one-fourth of the respective amplitudes. According to the teachings of some of the copending applications, if measurements were made at the 25 percent amplitude of each pulse, it is likely that all would be accepted and none would be rejected. It is seen, however, that the pulse 12 has a false peak at 16 and the pulse 14 has a pair of peaks 18 representing practically a flat top. From what is known about the theory and operation of the Coulter aperture, it is most unlikely that the pulses 12 and 14 are desirable pulses whose amplitudes are respectively proportional to the particles which caused the same and these should be rejected since they will provide false information on size.

Figure 1:
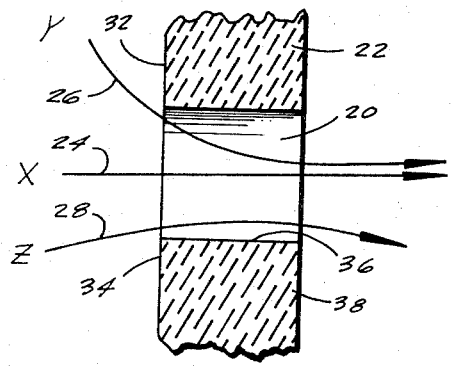
FIG. 1 is a diagrammatic view of the aperture of a Coulter particle analyzing device showing the paths of different particles through the aperture, the fluid or electrolyte in which the particles are suspended not being designated to keep the view simple.

In FIG. 1 there is illustrated an aperture 20 formed in a wafer 22 of corundum or the like having an aspect ratio of approximately 1 to 1 which is the conventional relationship of most Coulter apertures. It is assumed that three particles X, Y and Z have passed through the aperture 20 along the paths designated 24, 26 and 28. The particles are assumed to have no appreciable dimension since their respective sizes are substantially smaller than the diameter of the aperture 20, say of the order of one one-hundredth of the diameter of the aperture. Likewise, it is assumed that the particles are all of the identical size and hence should cause identical electrical effects when passing through the aperture. The ideal shape of pulse will be the bell shape of pulse 10 and all should have the identical duration as pulse 10 from time $t_a$ to $t_d$ of the graphs of FIG. 2.

The path 24 of the particle X is on an axial trajectory. The bell shape has a peak 30 which is fairly close to center although not necessarily so. The path 26 of the particle Y enters the apertures 20 on the left going toward the right as viewed in FIG. 1, passing near to the corner 32 and hence being subjected to the high current density that exists in the vicinity of that corner. This is assumed to have caused the false peak 16 occurring on the left side of the pulse 12. Thereafter, the particle Y is drawn into the high speed flow at the center of the aperture and its duration in the aperture 20 is quite close to the time $t_a$ to $t_d$.

The particle Z enters the aperture 20 along the path 28 which passes near the corner 34, moves toward the wall 36 but not quite getting into the stagnant region and is then drawn back to the center of flow but passing the corner 38 on the way. The passage near the two corners is assumed to have caused to two false peaks 18.

It is important to realize that the pulses which have been chosen for illustration are not necessarily those which would occur from the paths which would have been described. The paths 26 and 28 are approximately ones which could have resulted in such pulses, but probably would have caused pulses of greater duration. Such paths may not even occur in most apertures. For the purposes of the explanation pulses have been chosen which have practically the same bottom shape in each case so that at a fractional amplitude of 25 percent all have substantially the same duration. Thus, the levels X/4, Y/4 and Z/4 are all of the duration $t_b$ to $t_c$. In an axial trajectory sensor which discriminates between pulses on the basis of their duration at 25 percent of their amplitude, the particle pulse 10 would obviously be accepted, but so would the other two.

Unless there are some shape criteria, duration alone would be insufficient as a criterion upon which to discard the pulses 12 and 14. The invention provides structure which enables the application of shape criteria.

Before entering upon the discussion of the details of the embodiments of the invention, it should be remembered that the examples which are being used are only examples and would probably not occur in practice. In other words, the particles X, Y and Z are assumed to be of the identical size. A mono-sized particulate system would not be subject matter for examination by an axial trajectory sensor since the size information is already known. Only a multiple-sized particulate system would be examined by an axial trajectory sensor since it is size information that is desired. Counting could have been done previous to subjecting the particle pulses to the sensor. The desirable pulses which are produced by a multiple-sized particulate system comprise bell-shaped pulses whose durations are substantially the same but whose amplitudes differ. Such pulses are produced when the particles pass through the axial center of the aperture and all else are to be discarded in the sensor. The amplitudes at the various fractions of these ideal pulses will be respectively the same or quite close from pulse-to-pulse notwithstanding the differences in overall amplitude, and hence the sensors of the invention are effective to purify the particle pulses coming from the Coulter device for high quality pulse height analysis.

Figure 3A:
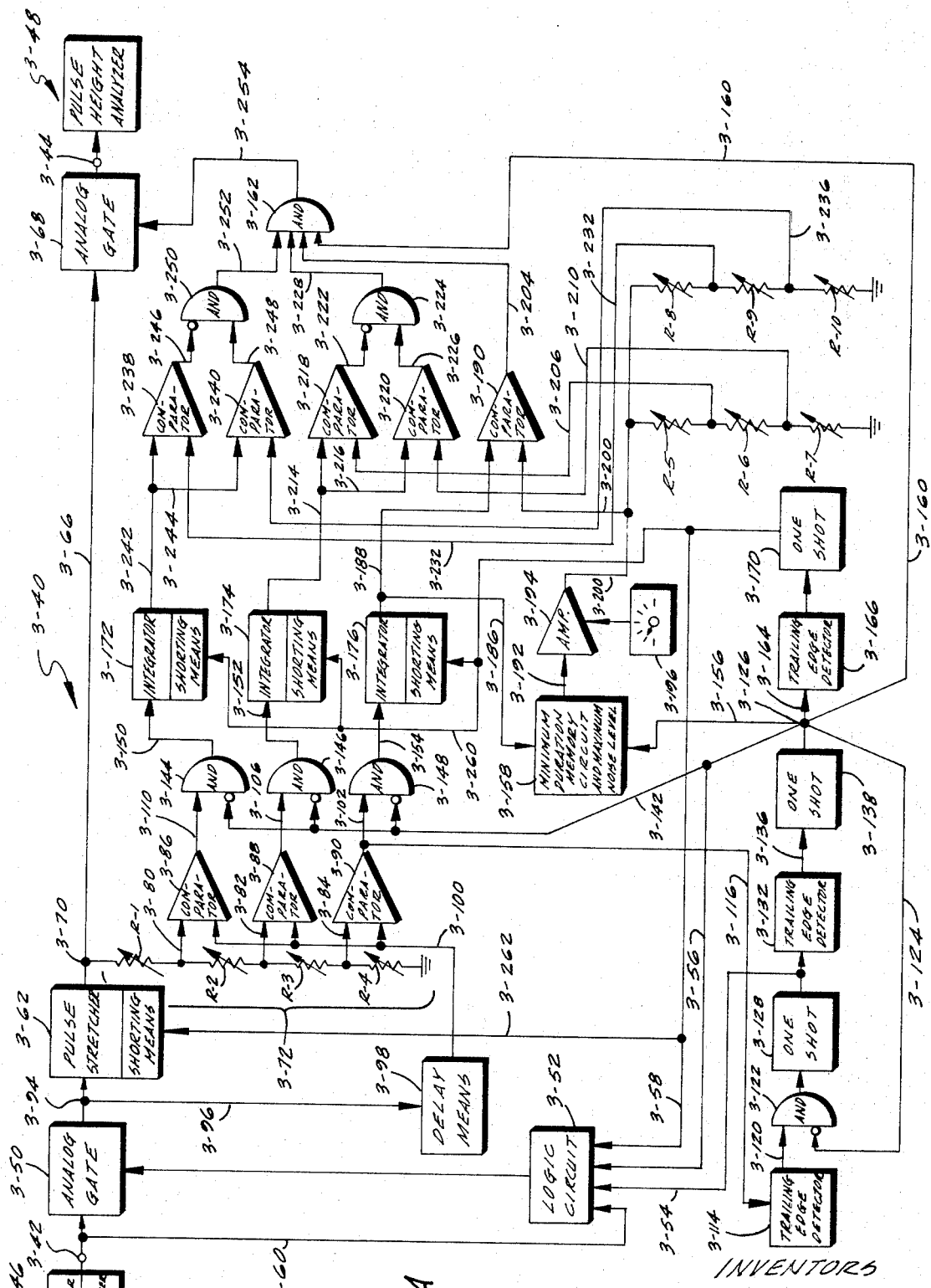
FIG. 3A is a block diagram of an axial trajectory sensor constructed in accordance with the invention, the sensor being shown connected with a Coulter particle analyzing device at its input and a pulse height analyzer at its output.

In FIG. 3A there is illustrated an axial trajectory sensor 3-40 which has the input terminal 3-42 and the output terminal 3-44. A Coulter electronic particle analyzing device 3-46 is connected to the input terminal 3-42 and all of the particle pulses which are received by the sensor 3-40 will be produced by the device 3-46. The Coulter device 3-46 is comprised of the usual stand, detector and counter. The stand includes the vessels which carry respective bodies of electrolyte and between which the aperture 20 extends, one of the said vessels comprising the aperture tube. It also has support structure, fluid moving means and electrodes. The detector includes circuitry which produces the particle pulses and which is connected to the electrodes. The counter may be any device which responds to the particle pulses and may include pulse height discriminating means. It may be omitted in instances where only size studies are made, but is shown in order to point out that since the sensor 3-40 will be discarding many pulses, it is best to make the counts prior to transmitting the particle pulses to said sensor 3-40.

The output signals which appear at the terminal 3-44 are applied to some form of pulse height analyzer 3-48 in order to make the sizing studies required using the purified signals produced by the sensor 3-40.

The analog gate 3-50 and the logic circuit 3-52 are provided in the sensor 3-40 in order to assure that there will be no particle pulse entering the sensor 3-40 until a pulse being processed has sufficiently cleared the components so that they are ready to accept a new pulse. Additionally, in case a pulse follows too closely so that the sensor 3-40 receives only a partial pulse, there will be no processing which takes place. The analog gate 3-50 is kept closed in such circumstances. A signal at any one of the lines 3-54, 3-56 or 3-58 will keep the analog gate 3-50 closed. A signal on line 3-60 which is above a certain threshold level set in the logic circuit 3-52 when the signals on lines 3-54, 3-56 and 3-58 subside means that only a partial signal is about to be processed. Under such circumstances, the logic circuit 3-52 keeps the analog gate off until the signal at the terminal 3-42 subsides below the threshold level.

The details of construction and operation of the logic circuit 3-52 working in conjunction with the analog gate 3-50 are disclosed in said copending application Case II.

Assuming that the analog gate 3-50 is open in order to receive signals, the processing of three pulses will be described. These three pulses are designated 3-10, 3-12 and 3-14 and are shown in graph A of FIG. 3B and they are identical to the particle pulses 10, 12 and 14 of FIG. 2. They are characterized by diverse shapes, but with the first of these, namely, 3-10 having the desirable shape of a particle pulse produced by a particle which passed through the aperture of the Coulter apparatus 3-46 along an axial trajectory. As in the case of FIG. 2, the portions of each pulse immediately above the base line have substantially the same configuration and represent substantially the same duration in the aperture. As will be seen, their 25 percent fractional amplitudes all have the same duration. The function of the sensor 3-40 is to accept the first one which is 3-10 and to reject the other two which are 3-12 and 3-14.

Considering first the particle pulse 3-10, it is passed through a pulse stretcher 3-62 and the resulting stretched pulse is shown at 3-64 of graph B of FIG. 3B appearing at the line 3-66. This line 3-66 may be considered a direct channel to the output terminal 3-44 through the electronic switch or analog gate 3-68. As will be seen, a portion of the stretched pulse 3-64 is permitted to pass if the analog gate 3-68 is open and will appear in its derived condition at the output terminal 3-44. The stretched pulse is shown in the graph B of FIG. 3B along with the pulse 3-10 from which it has been derived, but only the leading edge of the pulse 3-10 is used, the maximum amplitude reached being held by the pulse stretcher 3-62 as a charge upon a condenser until the pulse stretcher is reset, this latter occurring at the time $t_9$ as will be explained. The broken line of graph B shows the trailing edge of the pulse 3-10 which is not here used.

The stretched pulse also appears from the terminal 3-70 to ground across a string of resistors which constitute an attenuator 3-72. The string of resistors comprise adjustable resistors R1, R2, R3 and R4 forming a voltage divider so that the voltage is progressively less from the top to the bottom. The result is that the stretched pulse 3-64 is attenuated to three pulses 3-74, 3-76 and 3-78 shown in graph C of FIG. 3B. These three pulses appear respectively at the lines 3-80, 3-82 and 3-84 comprising one of the input terminals to the respective comparators 3-86, 3-88 and 3-90. The other input line of each comparator carries the same signal which consists of the pulse 3-10 but delayed by a certain time so that it appears as the pulse 3-92 in such time relationship with the three attenuated stretched pulses 3-74, 3-76 and 3-78 to intersect their flattened portions. This is shown in graph C of FIG. 3B. The pulse 3-10 is taken at the terminal 3-94 and applied by way of the line 3-96 to the delay means 3-98 from which it emerges as the pulse 3-92 on the line 3-100. The result of this delay is that the intersections of the pulse 3-92 with the three stretched and attenuated pulses 3-74, 3-76 and 3-78 are sharp and can readily be ascertained electronically and accurately by the comparators 3-86, 3-88 and 3-90.

The three comparators 3-86, 3-88 and 3-90 are connected in such a configuration that they will have outputs only when the signals on the upper terminals exceed those on the lower terminals. As a result, the pulse 3-92 is compared in turn with the stretched and attenuated pulses. The levels of the three latter pulses are chosen to be at the one-quarter, one-half and three-quarter fractional amplitudes of the pulse 3-10 or 3-92. Any other predetermined fractions could be used, requiring merely the proper adjustment of the resistors of the attenuator 3-72. Caution must be observed in connection with the delay means 3-98 since a passive structure will cause deterioration of the resulting particle pulse 3-92. Either an amplifier must be included in the block 3-98 or adjustment of the resistors R1, R2, R3 and R4 must be made to compensate for the loss of amplitude.

The pulse 3-92 exceeds the one-quarter fractional amplitude pulse 3-78 between the time $t_1$ and $t_6$ as a result of which the output of the comparator 3-90 on the line 3-102 comprises the rectangular duration-measuring pulse 3-104 occurring also between the same times and shown in graph F of FIG. 3B. The pulse 3-92 exceeds the one-half fractional amplitude pulse 3-76 between the times $t_2$ and $t_5$ as a result of which the output of the comparator 3-88 on the line 3-106 comprises the rectangular duration-measuring pulse 3-108 occurring also between the same times and shown in graph E of FIG. 3B. The pulse 3-92 exceeds the three-quarter fractional amplitude pulse 3-74 between the time $t_3$ and $t_4$ as a result of which the output of the comparator 3-86 on the line 3-110 comprises the rectangular duration-measuring pulse 3-112 occurring also between the same times and sown in the graph D of FIG. 3B.

All of the pulses 3-104, 3-108 and 3-112 have the identical amplitude which is achieved by proper choice of the characteristics of the three comparators 3-86, 3-88 and 3-90. The pulse 3-104 is applied to the trailing edge detector 3-114 by way of the line 3-116 and a trigger spike 3-118 (graph J of FIG. 3B) appears at the time $t_6$ on the line 3-120 to the VETO AND gate 3-122. If there is no signal on the line 3-124 from the terminal 3-126 the trigger spike 3-118 will trigger the one-shot multivibrator 3-128 whose output 3-130 shown in graph K appears on the line 3-54 and is the input to the trailing edge detector 3-132. Note that this rectangular wave 3-130 occurs after the rectangular wave 3-104 between the times $t_6$ and $t_7$. The trailing edge of the wave 3-130 is detected in the detector 3-132 whose output comprises the trigger spike 3-134 of the graph L of FIG. 3B at the time $t_7$ appearing on the line 3-136 as the input to the one-shot 3-138. This one-shot 3-138 produces a rectangular pulse 3-140 between the times $t_7$ and $t_9$ that constitutes an important timing pulse of the circuit. It is shown in graph M of FIG. 3B. Note that it occurs a substantial time after the completion of the duration-measuring pulses 3-104, 3-108 and 3-112 so that it will not interfere with the processing of pulses and conditions in the sensor have stabilized. The pulse 3-140 appears at the terminal 3-126.

The connection by way of the line 3-124 to the VETO AND gate 3-122 cuts off reception of any further timing pulses to the string of trailing edge detectors and one-shots. One connection from the terminal 3-126 by way of the line 3-142 to the VETO AND gates 3-144, 3-146 and 3-148 blocks these gates immediately after the duration-measuring pulses have been passed through these gates to the lines 3-150, 3-152 and 3-154, respectively, thus preventing interfering signals from following and upsetting the operation of the remaining components of the sensor. Through the line 3-56 the logic circuit 3-52 is assisted to block incoming signals by closing the gate 3-50. The line 3-156 leads from the terminal 3-126 to the minimum duration memory circuit 3-158 which establishes the standards or criteria against which the electrical time signal pulses will be compared as explained below. The line 3-160 connects the terminal 3-126 with the AND gate 3-162 and thus provides the strobing pulse which will cause an output pulse to be derived from the stretched pulse 3-64 if such strobing pulse gets through the gate 3-162. Finally, the strobing pulse 3-140 is applied on the line 3-164 to the trailing edge detector 3-166 that produces a trigger spike (not shown) that generates a resetting pulse 3-168 between the times $t_9$ and $t_{10}$ in the one-shot 3-170.

Referring now to the outputs from the VETO AND gates 3-144, 3-146 and 3-148, these appear on the lines 3-150, 3-152 and 3-154, respectively as the input signals to the integrators 3-172, 3-174 and 3-176. These integrators commence to integrate the rectangular pulses 3-104, 3-108 and 3-112, converting them from duration-measuring pulses to electrical time signal pulses of a ramp and plateau variety. The electrical time signal pulses are 3-178, 3-180 and 3-182, respectively, commencing with the largest first. These are shown in graphs I, H and G of FIG. 3B. In each case, there is a ramp which rises at a constant rate for the period of time that it is receiving the rectangular duration-measuring pulse, followed by a plateau that continues at a constant level until the time $t_9$, irrespective of the times between which the ramps occur. In each case, the amplitude of the plateau is proportional to the duration of the duration-measuring pulse which produced the same and hence proportional to duration of the particular fractional amplitude of the original pulse 3-10. Specifically, the amplitude of the plateau of the time signal pulse 3-178 is proportional to the duration of the rectangular duration-measuring pulse 3-104; the amplitude of the plateau of the time signal pulse 3-180 is proportional to the duration of the duration-measuring pulse 3-108; and the amplitude of the plateau of the time signal pulse 3-182 is proportional to the duration of the duration-measuring pulse 3-112.

The detailed construction and operation of the minimum duration memory circuit 3-158 are explained in copending application Case II. Suffice it to say that the circuit 3-158 establishes a standard in the form of a voltage level indicated at broken line 3-184 of graph I which represents the minimum duration of a previous electric time signal pulse measured by the circuit and remembered. This level is for the largest of the time signals and hence is chosen to be used in the one-quarter fractional amplitude case. The output of the integrator 3-176 is connected by way of the line 3-186 to the minimum duration memory circuit 3-158 to help establish the level. Such output is also connected on the line 3-188 to the comparator 3-190 as the upper terminal input thereto. The output of the minimum duration memory circuit 3-158 comprising the level or quasi-d.c. voltage 3-184 appears at 3-192 and is applied to an amplifier 3-194 whose gain is adjusted manually by the control 3-196 to give a slightly higher output for purposes of establishing a tolerance. This comprises the level 3-198 of graph I of FIG. 3B appearing on the line 3-200 leading to the lower terminal of the comparator 3-190.

The plateau of the electrical time signal pulse 3-178 being below the level 3-184, at the time commencing $t_7$ the pulse 3-202 generated in the memory circuit 3-158 will reduce the level 3-184 to that of the plateau and the level 3-198 will follow. The drop is completed at the time $t_8$. This is all explained in said copending application Case II.

The comparator 3-190 is in a configuration such that there will be an output at 3-204 for the time that the lower input exceeds the upper, and since the upper terminal has the pulse 3-178 while the lower has the level 3-198, there will be an output on the line 3-204 so long as the electric time signal pulse 3-178 has its amplitude below the level 3-198.

The voltage output 3-198 on the line 3-200 is applied to an array of variable resistors R5 to R10 and is used to construct the other levels for deciding whether to pass or not pass the other electrical time signal pulses. The voltage of the path 3-206 is equal to the voltage at the line 3-200 attenuated by the resistance ratio (R6 + R7)/(R5 + R6 + R7). The resistors are adjusted so that this ratio is approximately equal to the ratio of the maximum quarter-height duration to the maximum half-height duration of the perfect pulse. In other words, the ratio is chosen to be approximately equal to the ratio of the voltage level of the plateau of the pulse 3-178 with a small increase for tolerance to the voltage level of the plateau of the pulse 3-180 with a small increase for tolerance, it being assumed that these are the electrical time signal pulses which would be produced at the quarter and half fractional amplitudes of a perfect pulse such as 3-10. This ratio will give a voltage level which is shown at 3-208 of graph H of FIG. 3B as a broken line. In this same manner, the voltage at the line 3-210 is the attentuated voltage of the line 3-200, being attenuated by the ratio R7/(R5 + R6 + R7). This ratio is adjusted to provide a minimum level representative of the perfect pulse for the half fractional amplitude electric time signal pulse 3-180 as a result of which the voltage level 3-212 of graph H of FIG. 3B is established.

It is seen that the output of the integrator 3-174 appears on the lines 3-214 and 3-216 and is applied to the upper inputs of each of the comparators 3-218 and 3-220, respectively. The maximum level 3-208 is applied to the lower input of the comparator 3-218 and the minimum level 3-212 is applied to the lower input of the comparator 3-220.

When the electrical time signal pulse 3-180 whose amplitude represents the time duration of the half fractional amplitude of the particle pulse 3-10 comes along, if it does not exceed the level 3-208 there will be no output on the line 3-222 from the comparator 3-218 to the VETO input of the VETO AND gate 3-224. At the same time, if the amplitude of the signal pulse 3-180 does exceed the minimum level 3-212, there will be an output signal on the line 3-226. The VETO AND gate under these circumstances will produce an output or logical "one" on the line 3-228 which forms one of the inputs to the AND gate 3-162. This condition is met as seen from an examination of graph H of FIG. 3B since the plateau of the pulse 3-180 remains between the two levels 3-208 and 3-212.

By the same analysis given above, the ratios of the resistors R8, R9 and R10 are chosen to give proper attenuation to establish the maximum voltage level 3-230 on the line 3-232 and the minimum level 3-234 on the line 3-236 these being shown in graph G of FIG. 3B as broken lines and representing the maximum and minimum amplitudes of electrical time signal pulse 3-182 for a perfect pulse whose duration has been measured at three-quarters of its amplitude. If the plateau falls between the levels 3-230 and 3-234, then there will be a comparison made in the comparators 3-238 and 3-240 between these levels and the output signal 3-182 from the integrator 3-172. This latter output is applied to the upper inputs of the comparators 3-238 and 3-240 on the lines 3-242 and 3-244. There is no output at 3-246 and a logical "one" at 3-248 so that the VETO AND gate 3-250 puts out a signal on the line 3-252.

With signals appearing at the three inputs of the AND gate 3-162 representing the comparisons of the electric timing signals with standards of levels that provide the criteria of acceptance or rejection, when the strobing signal 3-140 appears, after the pulse 3-130 has been generated and passed, there will be an output on the line 3-254 comprising the logical "one" signal 3-256 of graph P occurring between the times $t_7$ and $t_9$. This opens the analog gate 3-68 and, for the same period of time a portion of the stretched pulse 3-64 is permitted to pass to the terminal 3-44. This portion of the stretched pulse comprises the pulse 3-258 of graph Q of FIG. 3B having the same amplitude X as the original pulse 3-10 and having the same duration as the strobing pulse 3-140.

When the strobing pulse 3-140 has been completed, as explained above, it produces a resetting pulse 3-168 in the one-shot 3-170. This pulse appears on the lines 3-260 and 3-262 and, between the times $t_9$ and $t_{10}$ operates the shorting means in the integrators and the pulse stretcher to reset them for reception of following signals.

Attention is now invited to the second pulse 3-12 which, as described, has the same duration as the desirable pulse 3-10 at its base line and for a substantial portion near the base line, but which has a false peak 3-264 on its leading edge.

The same processing occurs as described above. In this case, the duration-measuring pulse 3-266 representing the quarter amplitude duration has about the same duration as the pulse 3-104, but the pulse 3-268 representing the half amplitude duration is somewhat larger than the pulse 3-108 and the three-quarters amplitude duration-measuring pulse 3-270 is very much smaller than the pulse 3-112. Accordingly, the resulting electrical time signal pulses 3-272, 3-274 and 3-276 do not all meet the criteria established for desirable pulses. While 3-272 lies between the levels 3-184 and 3-198 and will result in a signal output at the line 3-204, the pulse 3-274 exceeds the levels 3-212 and 3-208 and will not produce an output signal at line 3-228. Likewise, the pulse 3-276 is smaller than either of the levels 3-234 and 3-230 and hence there will be no output at the line 3-252.

Absent output signals on any one of the input lines to the gate 3-162 there will be no output on the line 3-254 and the pulse 3-12 will thus not produce an output pulse at the terminal 3-44 but will be disregarded.

The identical analysis will show that the pulse 3-14 will also be disregarded, since its electrical time signal pulses 3-278 and 3-280 do not meet the criteria established by the levels 3-212 and 3-208 on the one hand and 3-230 and 3-234 on the other hand. This is true notwithstanding that the pulse 3-282 meets the criteria and produces an output signal on the line 3-204.

Thus, it can be seen that the circuitry of the sensor 3-40 provides a sort of multiple combination of requirements all of which must be met in order for a particle pulse to produce an output and be considered for inclusion in the information passing to the pulse height analyzing device 3-48. The result is that only pulses which have both the proper duration and the proper shape will be considered, resulting in a substantial purification of the pulses passed to the pulse height analyzer.

In the sensor 3-40, it may be desirable to delay the occurrence of the strobing pulse 3-140 until after the occurrence of the pulse 3-202 to avoid shortening of the strobing pulse when the pulses 3-178, 3-180 and 3-182 jump into acceptable position after the drop in their reference voltages. This can be done by taking the strobing pulse from the one-shot 3-170 or some other timing circuit, delaying the rest pulse 3-168 accordingly so that the stretched pulses aqe somewhat longer.

Another useful refinement is to provide a circuit which prevents unnecessary dropping of the level 3-184 and 3-198 which could be caused by a sharp noise pulse discharging the memory capacitor in the circuit 3-158 much below the very minimum pulse duration level which it is known can be generated in the Coulter device 3-46. This would eliminate waiting time for the voltage to recover. A circuit is provided establishing a voltage below which no discharge of the memory capacitor can occur, so that the recovery time is short. Such circuits are capable of being constructed by those skilled in this art, and would be included in block 3-158.

Figure 4A:
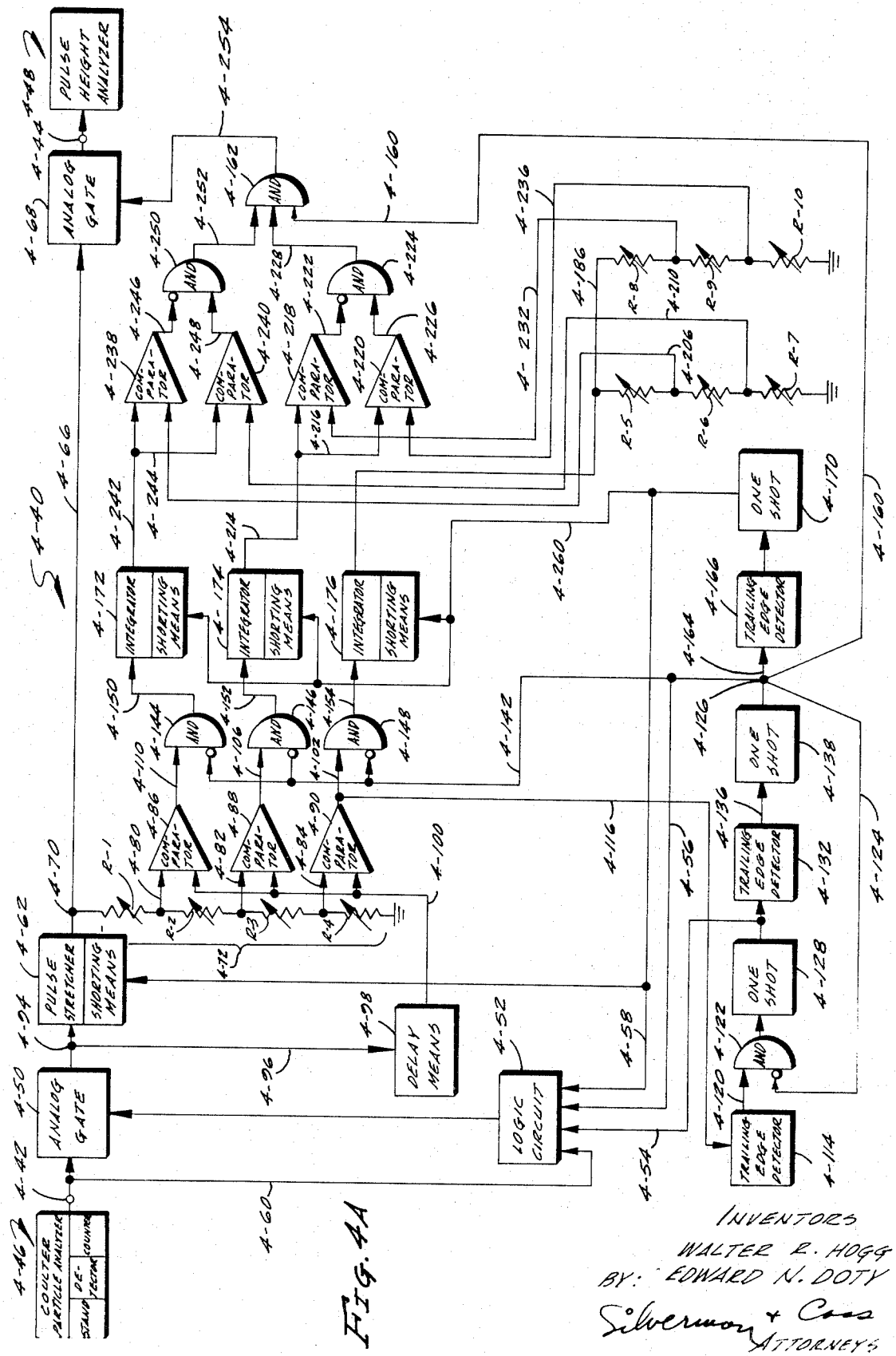
FIG. 4A is a block diagram similar to that of FIG. 3A but showing a modified form of axial trajectory sensor.
Figure 4B:
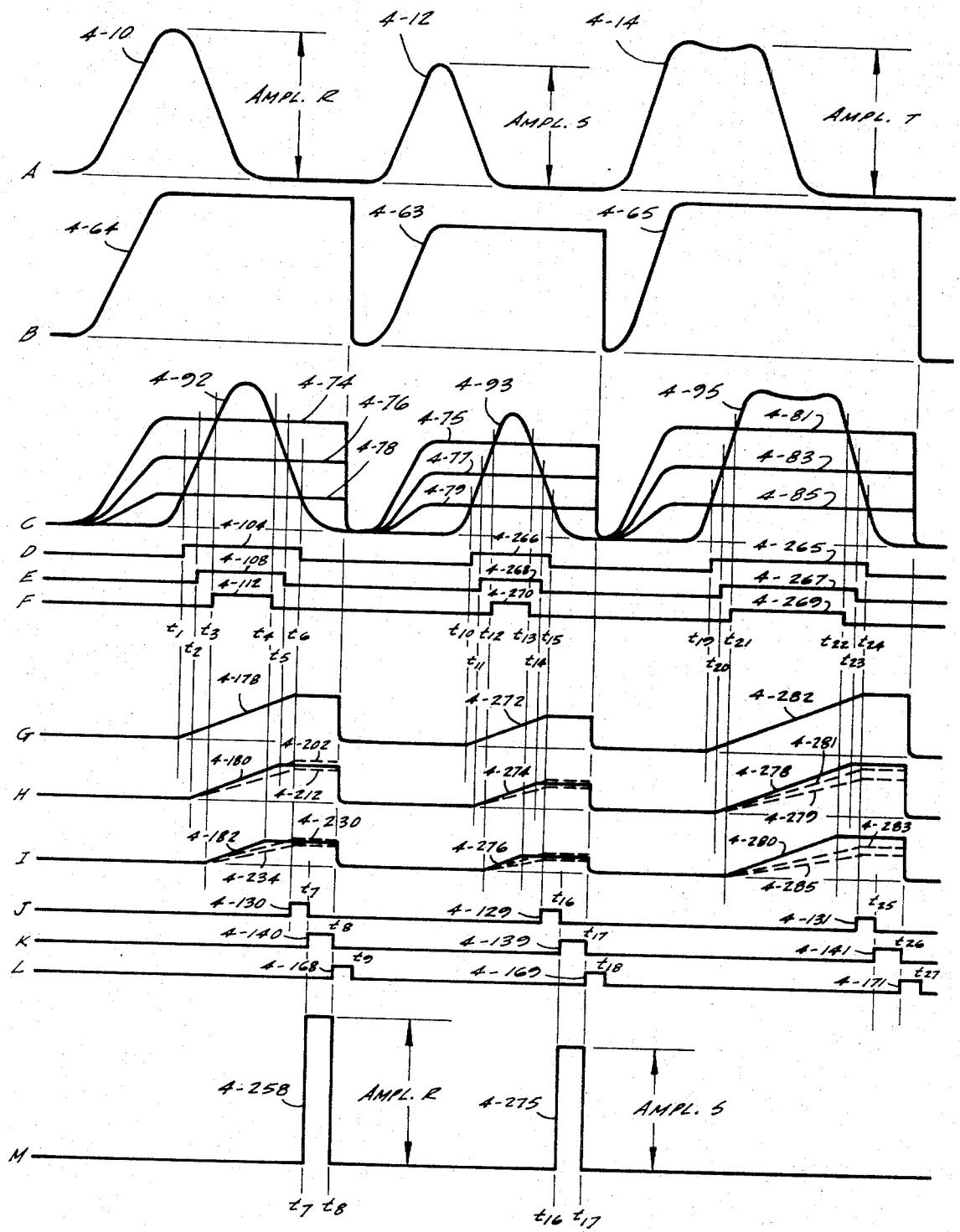
FIG. 4B is a diagram similar to that of FIG. 3B but relating to the wave shapes produced in the sensor of FIG. 4A.

In FIGS. 4A and 4B there are illustrated respectively a modified embodiment of the invention and the wave shapes of pulses therein. In every instance, where feasible, identical or equivalent parts carry the same reference numerals as in FIGS. 3A and 3B, except that the prefix 4 is used in place of the prefix 3.

The sensor 4-40 is characterized by its simplicity and by the fact that it accepts or rejects particle pulses on the basis of shape alone, irrespective of duration. There is no previous duration memory circuit equivalent to the device 3-158 of FIG. 3A with its accompanying amplifier 3-194 and control 3-196. Instead, the quarter fractional amplitude electrical time signal pulse is used as a standard and assumed to be acceptable. The criteria for accepting or rejecting the other electrical time signal pulses are derived by modifying the quarter fractional amplitude electrical time signal pulse. The sensor 4-40 will thus respond to pulses whose shapes are proportionally the same, even if there is a substantial difference between the durations of the pulses. While in theory all pulses which are produced by particles passing through a Coulter aperture are equal in duration, this is not necessarily true for particles of substantially different size even when passing on axial trajectories, especially if the larger particles are sufficiently massive that they cannot be accelerated to the velocity of the suspending liquid. Substantially above the base line, however, these pulses will have very close to the identical proportional shape. The sensor 4-40 will accept such pulses.

Another situation which is taken into account by the sensor 4-40 is one where one aperture is substituted for another of a different diameter but without substantially changing the aspect ratio of the aperture. In such case, particle pulses will have different durations for particles traversing the different apertures, but their proportional shapes will not change. The sensor of FIG. 4A will pass such particle pulses.

In FIG. 4B, there are illustrated three pulses, 4-10, 4-12 and 4-14 in graph A having amplitudes R, S, and T. The two pulses 4-10 and 4-12 are such as would result from the passage of particles on axial trajectories through apertures, such pulses having a bell shape. These pulses, however, have substantially different durations, even at their fractional amplitudes. For example, considering the duration-measuring pulses of graphs D, E, and F, the quarter fractional height pulses 4-108 and 4-266 are substantially different in duration, and yet the proportional duration of pulse 4-104 with respect to 4-108 is almost the same as the proportional duration of the pulse 4-266 with respect to 4-268.

The third pulse 4-14 is quite broad in duration and obviously is to be discarded. Its duration-measuring pulses taken at fractional amplitudes are 4-265, 4-267 and 4-269 and their relative durations are considerably different from the ratios between the other two sets of duration-measuring pulses.

The progress of the three pulses through the sensor 4-40 up to integrators 4-172, 4-174 and 4-176 is the same as previously described in connection with sensor 3-40. At this point, the structure differs. Considering first the pulse 4-10 and its resulting shaped pulses, the outputs from the integrators appear on the respective lines 4-242, 4-214 and 4-186 and consist of the electrical time signal pulses 4-182, 4-180 and 4-178 respectively of graphs I, H, and G of FIG. 4B. These are ramp and plateau pulses with the ramp in each case rising at a constant rate for the period of time that the duration-measuring pulse from which it is derived was generated.

The three-quarter fractional amplitude pulse 4-182 is applied to the upper input of each of the comparators 4-238 and 4-240 by way of the lines 4-242 and 4-244. The half fractional amplitude pulse 4-180 is applied to the upper input of the comparators 4-218 and 4-220 by way of the lines 4-214 and 4-216. The quarter fractional amplitude pulse 4-178 is impressed across the two strings of resistors R5-R6-R7 and R8-R9-R10 to ground by way of the line 4-186. The ratios of resistors are chosen so that the leads 4-206 and 4-210 establish voltage upper and lower limits 4-230 and 4-234 for the pulse 4-182 while the leads 4-232 and 4-236 establish voltage upper and lower limits 4-208 and 4-212 for the pulse 4-180. The resistors are manually adjusted on the basis of electrical time signal pulses derived from a perfectly shaped pulse 4-10 so that each pulse 4-182 and 4-180 will fall exactly in the center of its "window."

For the comparator 4-238, with the voltage 4-230 applied by way of the line 4-206 to the lower input, there will be not output on the line 4-246 and no input to the VETO terminal of the VETO AND gate 4-250. At the same time, the voltage 4-234 is applied to the lower input terminal of the comparator 4-240 and compared with the pulse 4-182 which is greater. Accordingly, there will be an output in the line 4-248 which is an input to the VETO AND gate 4-250. Insofar as pulse 4-182 is concerned, there will thus be a logical "one" on the line 4-252 to the AND gate 4-162.

As for the pulse 4-180, its window voltages 4-208 and 4-212 appear respectively on the lines 4-232 and 4-236 leading to the lower inputs of the respective comparators 4-218 and 4-220. No signal will appear on line 4-222 because the pulse 4-180 does not exceed the voltage 4-208, but a signal will appear on the line 4-226 because the pulse 4-180 does exceed the voltage 4-212. In the same manner as described above, there will be a logical "one" on the output line 4-228 of the VETO AND gate 4-224.

With two inputs to the AND gate 4-162, when the strobing pulse 4-140 appears from the terminal 4-126 on the line 4-160, there will be an output on line 4-254 from the AND gate 4-162 and the analog gate 4-68 will be opened between the times $t_7$ and $t_8$ to derive a pulse 4-258 (graph M of FIG. 4B) from the stretched pulse 4-64 and pass same to the terminal 4-44. The pulse 4-258 has the same amplitude R as the original pulse 4-10 and the stretched pulse 4-64 and has the duration of the strobing pulse 4-140.

The pulse 4-130 of graph J and 4-168 of graph L of FIG. 4B serve the same functions as the pulses 3-130 of graph K of FIG. 3B and 3-168 of graph N of FIG. 3B. In all other respects, the circuits 3-40 and 4-40 function the same, but pulses generated are not all shown in FIG. 4B.

The identical analysis can be made of the pulse 4-12 which has an amplitude S and a perfect shape, albeit a duration which is considerably shorter than that of the pulse 4-10. The sensor 4-40 will produce a derived pulse 4-275 of amplitude S at the output terminal 4-44. The duration-measuring pulses are shown at 4-266, 4-268 and 4-270 in graphs D, E, and F respectively and the other pulses are easily identified by comparison with the equivalent ones of the pulse 4-10.

As for the third particle pulse 4-14 with amplitude T, when its stretched pulse 4-65 of Graph B of FIG. 4B is attenuated to produce the pulses 4-81, 4-83 and 4-85 of graph C of FIG. 4B and compared with the delayed pulse 4-95, the resulting duration-measuring pulses 4-265, 4-267 and 4-269 do not have the proportions of duration-measuring pulses from a perfect particle pulse. When the windows are produced from the quarter fractional amplitude electrical time signal pulse 4-277, they fall as shown at 4-279, 4-281, 4-283 and 4-285. The three-quarter pulse 4-280 exceeds both voltages of its window so that there will be a signal on line 4-246 to the VETO input terminal of VETO AND gate 4-250. There will also be a signal on line 4-248 because the pulse 4-280 exceeds voltage 4-285, but this will be to no avail. The result is that there will be a logical "zero" on the line 4-252 and no output from the AND gate 4-162.

This, of course, is sufficient to discard pulse 4-14, but from the graph H of FIG. 4B it can be seen that the pulse 4-278, the half fractional amplitude electrical time signal pulse, also exceeds both voltages 4-281 and 4-279 of its window so that additionally on this account pulse 4-14 would be discarded.

The invention is capable of being embodied in structures which differ in detail considerably from those described but without departing from the spirit or scope of the invention as defined in the appended claims. For instance, instead of attenuating the input signal to any of the comparators such as the input 3-80 to the comparator 3-86 of FIG. 3, the opposite input such as 3-100 could be amplified by the reciprocal factor. Instead of using the quarter-height duration as a reference, the three-quarter height duration could be used, and the others obtained by amplification. There could be two, or more than three measurements made on each pulse for more relaxed or more stringent limits on pulse shapes and/or durations.

What is desired to secure by Letters Patent of the United States is:

1. An axial trajectory sensor for use with a Coulter type particle analyzing apparatus in which particles passing through an aperture generate desirable particle pulses whose amplitudes are most nearly proportional to their respective sizes when passing closest to an axial trajectory through the aperture and having thereby a certain approximate shape and in which particles passing through said aperture on trajectories displaced from the axis will generate undesirable particle pulses whose amplitudes are not necessarily proportional to their respective sizes and whose shapes tend to depart from said certain approximate shape; said sensor acting to respond to desirable pulses and not to respond to said undesirable particle pulses and comprising:

- A. input terminal means and output terminal means having a channel for passage of electrical signals between the terminal means with switch means in said channel to control the signals which appear at the output terminal means, the input terminal means adapted to have the desirable and undesirable particle pulses applied thereto,
- B. means for measuring the duration of at least a segment of a particle pulse applied to said input terminal means at a plurality of different predetermined fractions of the amplitude thereof and deriving a plurality of duration-measuring pulses having the measured durations of the pulse segments at the respective fractions,
- C. means for converting each said duration-measuring pulse into a respective electrical time signal pulse whose amplitude is proportional to the duration of the duration-measuring pulse from which it has been converted whereby to derive a plurality of electrical time signal pulses,
- D. means connected with said converting means acting to establish for at least less than all of said electrical time signal pulses individual to said respective fractions a voltage level for each said electrical time signal pulse, each electrical time signal pulse derived from a desirable particle pulse falling below its so-established voltage level and if derived from an undesirable particle pulse falling above its so-established level,
- E. means comparing the amplitude of each said electrical time signal pulse individual to said respective fractions with its so-established voltage level and producing one type of energized signal if said last-mentioned electrical time signal pulse is less than its so-established voltage level and producing a second type of energizing signal if said last-mentioned electrical time signal pulse is greater than its so-established voltage level,
- F. means for producing a strobing pulse of predetermined duration for each particle pulse applied to said input terminal means, and
- G. gating means having said strobing pulse applied thereto, every energizing pulse produced by said comparing means also being applied to said gating means, said gating means being connected to said switch means in the channel and acting to operate said switch means to pass a signal derived from said input terminal means when said strobing pulse is applied, but only if every energizing signal is of the first type.

2. The sensor as claimed in claim 1 in which there is a voltage level established for all but one electrical time signal pulse.

3. The sensor as claimed in claim 3 in which said converting means act to establish for at least less than all of the remaining said electrical time signal pulses individual to said respective fractions other than said one electrical time signal pulse a second voltage level for each said electrical time signal pulse, each electrical time signal pulse derived from a desirable pulse falling above its so-established second voltage level and if derived from an undesirable particle pulse falling below its so-established second voltage level, in which the comparing means also compares each electrical time signal pulse individual to said respective fractions with its so-established second voltage level if it has one, and producing a third type of energizing signal if said last-mentioned time signal pulse is above its so-established second voltage level and producing a fourth type of energizing signal if said last-mentioned time signal pulse is below its so-established second voltage level, and said gating means acting to operate said switch means only if, in addition to energizing signals of the first type, energizing signals of the third type are applied thereto to the exclusion of energizing signals of the fourth type.

4. The sensor as claimed in claim 3 in which said means acting to establish said voltage levels as aforesaid is activated by said one electrical time signal pulses.

5. The sensor as claimed in claim 4 in which the means activated by said one of said electrical time signal pulses comprise voltage modifying means and the voltage levels comprise modified forms of said one electrical time signal pulse.

6. The sensor as claimed in claim 5 in which said one of said electrical time signal pulses is the largest produced by said converting means for any given particle pulse and said modifying means comprise attenuating means.

7. The sensor as claimed in claim 1 in which said means acting to establish a voltage level as aforesaid is activated by one of said electrical time signal pulses.

8. The sensor as claimed in claim 7 in which there is a voltage level established for the electrical time signal pulses other than the said one.

9. The sensor as claimed in claim 8 in which the means activated by said one of said electrical time signal pulses comprise voltage modifying means and the voltage levels comprise modified forms of said one electrical time signal pulse.

10. The sensor as claimed in claim 9 in which the said one of said electrical time signal pulses is the greatest produced by said converting means for any given particle pulse and said modifying means comprise attenuating means.

11. The sensor as claimed in claim 7 in which there is a voltage level established for all of the electrical time signal pulses including said one.

12. The sensor as claimed in claim 11 in which the means activated by said one of said electrical time signal pulses comprise a memory circuit which remembers the minimum amplitude of previous said one electrical time signal pulses and produces an output in the form of a quasi-d.c. voltage comprising the level for said one electrical time signal pulse, and said last-mentioned means include voltage modifying means, the other voltage levels comprising modified forms of said quasi-d.c. voltage.

13. The sensor as claimed in claim 12 in which the said one of said electrical time signal pulses is the largest produced by said converting means for any given particle pulse and said modifying means comprise attenuating means.

14. The sensor as claimed in claim 1 in which there is a voltage level established for all electrical time signal pulses.

15. The sensor as claimed in claim 14 in which said converting means act to establish for at least less than all of said electrical time signal pulses individual to said respective fractions a second voltage level for each said electrical time signal pulse, each electrical time signal pulse derived from a desirable pulse falling above its so-established second voltage level and if derived from an undesirable particle pulse falling below its so-established second voltage level, in which the comparing means also compares each electrical time signal pulse individual to said respective fractions with its so-established second voltage level if it has one, and producing a third type of energizing signal if said last-mentioned time signal pulse is above its so-established second voltage level and producing a fourth type of energizing signal if said last-mentioned time signal pulse is below its so-established second voltage level, and said gating means acting to operate said switch means only if, in addition to energizing signal of the first type, energizing signals of the third type are applied thereto to the exclusion of energizing signals of the fourth type.

16. The sensor as claimed in claim 15 in which said means acting to establish said voltage levels as aforesaid is activated by one of said electrical time signal pulses.

17. The sensor as claimed in claim 16 in which there are second voltage levels established for all of said electrical time signal pulses.

18. The sensor as claimed in claim 16 in which there are second voltage levels established for all of said electrical time signal pulses other than said one.

19. The sensor as claimed in claim 18 in which the means activated by said one electrical time signal pulse comprise a memory circuit which remembers the minimum amplitude of previous said one electrical time signal pulses and produces an output in the form of a quasi-d.c. voltage comprising said first level for said one electrical time signal pulse, and said last-mentioned means include voltage modifying means, the other voltage levels comprising modified forms of said quasi-d.c. voltage.

20. The sensor as claimed in claim 18 in which means are provided to prevent noise pulses from dropping the said first level inordinately.

21. The sensor as claimed in claim 19 in which said one electrical time signal pulse is the largest produced by said converting means for any given particle pulse and said modifying means comprise attenuating means.

22. An axial trajectory for use with a Coulter type particle analyzing device, comprising:
A. means for measuring the duration of each particle pulse produced by the analyzing device at a plurality of different predetermined fractional amplitudes, B. means for comparing at least some of such measurements with a standard established for each fractional amplitude measured, and
C. means for rejecting all particle pulses, all of whose measurements at the fractional amplitudes measured do not meet such standards.

23. The sensor as claimed in claim 22 in which means are provided for establishing said standards on the basis of the measurement of the duration of one fractional amplitude of said each particle pulse.

24. The sensor as claimed in claim 23 in which a standard is established for all fractional amplitudes including said one fractional amplitude.

25. The sensor as claimed in claim 23 in which a standard is established for all fractional amplitudes but said one fractional amplitude.

26. The sensor as claimed in claim 23 in which the measurement of the duration of said one fractional amplitude includes a comparison with the duration of previous particle pulses made at said one fractional amplitude.

27. The method of sensing between the particle pulses caused by particles passing through a Coulter particle apparatus aperture on the axis of the aperture and off the axis of the aperture, which comprises:
A. measuring the duration of each particle pulse at a plurality of predetermined fractions of the amplitude thereof and deriving therefrom a plurality of duration-measuring pulses of constant amplitude and each having a respective duration,
B. converting the duration-measuring pulses into respective electrical time signal pulses whose amplitudes are respectively proportional to the time durations of the said duration-measuring pulses,
C. establishing for at least less than all of said fractional amplitudes a signal level for each, equivalent to the maximum desired duration for each time signal pulse individual to each said fractional amplitude having a signal level,
D. comparing the said electrical time signal pulses having signal levels each with its particular signal level and obtaining an energizing signal of one type for each electrical time signal pulse that does not exceed said level and an energizing signal of a second type if said level is exceeded, there being one such energizing signal for each electrical time signal pulse having a signal level, and
E. deriving an electrical signal from each whole particle pulse and passing or blocking the derived signal on the basis of whether all of the energizing signals are of the first type or any of the signals is of the second type, respectively.

28. The method as claimed in claim 27 in which all signal levels are established by modifying the time signal pulse of one fractional amplitude of said plurality of predetermined fractions for each particle pulse.

29. The method as claimed in claim 28 in which a signal level is established for all fractional amplitudes.

30. The method as claimed in claim 28 in which a signal level is established for all fractional amplitudes but said one.

31. The method as claimed in claim 28 in which the modification proceeds on the basis of prior electrical time signal pulses received and measured to ascertain the lowest amplitude thereof.

32. The method as claimed in claim 30 in which the modifying comprises attenuating.

33. The method as claimed in claim 27 in which in addition, second lower signal levels are established for at least some of said fractional amplitudes that have said first-mentioned signal levels and the electrical time signal pulses are also compared with said second levels, respectively, to produce energizing signals of a third type if the second level is exceeded and of a fourth type if the second level is not exceeded, and the energizing signals additionally must include only signals of the third type and none of the fourth type to pass said signal derived from the whole particle pulse.

34. An axial trajectory sensor for use with a particle study apparatus in which particles pass through a detecting zone having an axis for producing particle pulses, the particles, when passing closest to an axial trajectory through the detecting zone, producing desirable particle pulses having amplitudes which are most nearly proportional to the respective sizes of the particles, and also thereby having a certain approximate shape, and in which particles passing through the detecting zone on trajectories displaced from its axis will produce other particle pulses having amplitudes which are not necessarily proportional to their respective sizes and having shapes which tend to depart from said certain approximate shape; said sensor being constructed with an input and arranged to respond to said desirable particles pulses in a first manner and to respond to said other particles pulses in a second manner and comprising:

A. means for measuring the duration of at least a segment of a particle pulse applied to said input at a plurality of different predetermined fractions of the amplitude thereof and deriving a plurality of duration-measuring pulses having the measured durations of the pulse segments at the respective fractions;

B. means for establishing a standard for a desired duration value for each of at least some of said measured fractional durations;

C. means for comparing each said standard with its related measured fractional duration and for generating a first type of signal if all of the measured fractional durations do not exceed their said standards and a second type of signal if any of the measured fractional durations exceeds its standard; and D. means coupled to receive said first and second type of signals for generating, respectively, the first and second manners of response.

\* \* \* \* \*

PO-1050
(5/69)

UNITED STATES PATENT OFFICE
CERTIFICATE OF CORRECTION

Patent No. 3,710,264  Dated January 9, 1973

Inventor(s) EDWARD NEAL DOTY - WALTER R. HOGG

It is certified that error appears in the above-identified patent and that said Letters Patent are hereby corrected as shown below:

Column 1, lines 17-18 delete "Applicant...VII" and insert --Applicants herein are co-applicants in Case VII. Applicant Hogg is co-applicant with another in Case III ---; column 3, line 2, delete "firsthmentioned" and insert --first mentioned--; column 5, line 19, before "two" change "to" to --the--; line 23, before "have" delete "would"; column 12, line 8, change "rest" to --reset--; line 9, change "aqe" to --are--; column 13, line 51, change "not" to --no--; column 16, line 4, change "3 in" to --2 in--; column 17, line 31, change "signal" to --signals--.

Signed and sealed this 27th day of November 1973.

(SEAL)
Attest:

EDWARD M. FLETCHER, JR.
Attesting Officer

RENE D. TEGTMEYER
Acting Commissioner of Patents